E. W. PAULSON.
CORN PLANTER FRAME CONSTRUCTION.
APPLICATION FILED JULY 6, 1917.

1,267,111.

Patented May 21, 1918.

INVENTOR.
E. W. PAULSON
BY Milton L. Crandall
ATTORNEYS.

UNITED STATES PATENT OFFICE.

ERNEST W. PAULSON, OF OTOE, IOWA.

CORN-PLANTER-FRAME CONSTRUCTION.

1,267,111. Specification of Letters Patent. Patented May 21, 1918.

Original application filed September 29, 1916, Serial No. 122,924. Divided and this application filed July 6, 1917. Serial No. 179,031.

*To all whom it may concern:*

Be it known that I, ERNEST W. PAULSON, a citizen of the United States, and a resident of Otoe, in the county of Woodbury and State of Iowa, have invented certain new and useful Improvements in Corn-Planter-Frame Construction, of which the following is a specification.

The present invention relates to corn planters.

This application is divided from and covers the specific frame construction disclosed in my concurrent application Ser. No. 122,924 filed Sept. 29, 1916.

In the structure presented in my U. S. Patent #1,174,604 March 7, 1916 is provided means for supporting the seed planting mechanisms consisting of upper and lower pairs of rods having their forward ends pivoted to the main frame and their rear ends pivoted to the opposite sides of the chutes of the planting mechanism. In order to pivotally support the planting mechanisms and yet hold them firmly against lateral movement and also to afford means for raising and lowering said mechanisms, a crank shaft is provided having its wrists journaled in the seed planting mechanisms and its extremities slidably supported on the main frame. This construction has been found to suffer from defects, chiefly as follows:

The crank shaft and its associated parts add considerable complication and cost to the mechanism and inasmuch as they are journaled in the upper part of said mechanism they do not positively prevent lateral movement of the lower part, which latter part should at all times be immovable laterally.

The present invention therefore, has for its primary object an improvement in the general construction disclosed in my prior patent.

Another object of the invention is the production in a corn planter of an improved, simplified, inexpensive and dependable means for pivotally supporting the seed planting mechanisms in such a manner as to positively prevent their lateral movement and yet permit them to move freely in vertical planes to accommodate themselves to irregularity of the earth's surface.

Furthermore, the invention contemplates in a corn-planter improved means for raising and lowering the planting mechanism.

Figure 1:
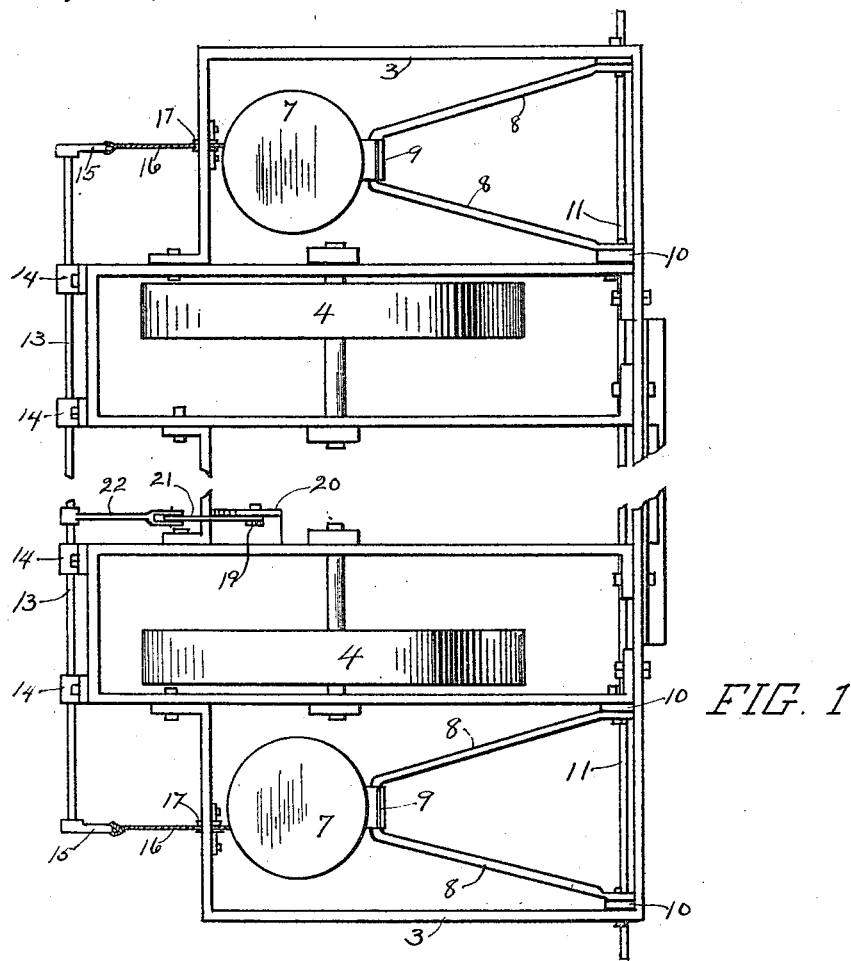
Figure 2:
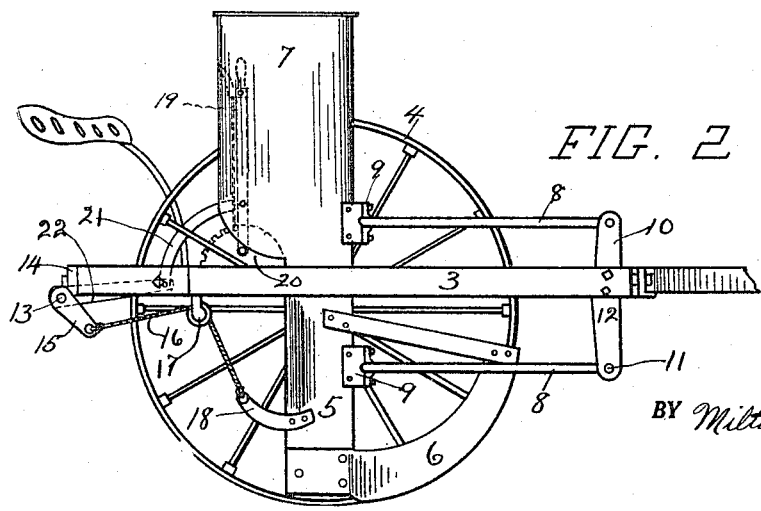

With these and other objects in view, the invention, consisting in the combination, construction and novel arrangement of parts will be fully understood from the following description, reference being had to the accompanying drawings which form a part of this application and in which like characters of reference indicate corresponding parts throughout the several views, of which, Figure 1 is a fragmentary plan of a multiple-row corn-planter constructed in accordance with the invention; and Fig. 2 is a side elevation of the same.

Referring, now, to the illustrations, 3, represents the main-frame carried by travel-wheels, 4. The planting mechanisms each include an upright seed chute, 5, a furrow opening runner, 6, at the lower end thereof, and a seed hopper, 7, at the upper end thereof, operable to deliver seeds to the chute. The seed dropping mechanisms are pivotally supported to move freely vertically and are held rigidly against lateral movement by means of upper and lower frames comprising rods, 8, bent substantially in a U-shape and having their webs journaled in bearings, 9, mounted on the front side of the chute. The ends of the upper rod are pivoted to an upright 10, on the main-frame, while the ends of the lower rod are pivoted on a transverse shaft, 11, journaled in a bracket bearing 12, depending from the main-frame.

The said shaft it is understood, is one of the rock-shafts disclosed in my parent application and affords a very convenient pivot for the lower rod, 8.

Means for simultaneously raising and lowering the seed planting mechanisms consists preferably, of a transverse rock-shaft 13, journaled in bearings on the rear of the main frame and provided with crank-arms, 15, connected to flexible links, 16, which pass over direction-pulleys, 17, mounted on the main-frame; and connected with arms 18, on the lower portions of the seed planting mechanisms.

The shaft is actuated by means of a suitable lever, 19, fulcrumed on a quadrant, 20, mounted on the main-frame and connected by a link, 21, with a crank arm, 22, on the rock-shaft.

It is now evident that rearward movement of the lever will turn the rock-shaft to simultaneously raise the seed dropping mechanisms, and when thrown rearwardly the said shaft is reciprocated to permit the seed planting mechanisms to drop to the ground. The flexible links, 16, permit the seed planting mechanisms to individually rise and fall as they encounter irregularities in the earth's surface.

Having thus described my invention what I claim as new and desire to secure by Letters Patent of the United States, is,—

1. In a corn-planter including a main-frame and a seed planting mechanism having an upright chute and a furrow-opening member at the bottom thereof, the combination of a pair of superposed substantially U-shaped rods having their webs pivoted to the chute and their ends pivoted to the main-frame.

2. In a corn-planter including a main-frame and a seed planting mechanism including a seed chute and a furrow-opening member at the bottom thereof, the combination of a pair of superposed substantially U-shaped rods, and upper and lower bearings on the front of the chute, the webs of the rods being journaled within the bearings and the ends of the rods being pivoted to the main-frame.

3. In a multiple-row corn-planter, the combination with a main-frame and a plurality of seed planting mechanisms arranged transversely thereof and each including a seed chute and a furrow-opening member at the bottom thereof, a pair of substantially U-shaped rods for each seed planting mechanism, upper and lower bearings on the front sides of the chutes, the webs of the rods being journaled in said bearings and the ends of the rods being pivoted to the main-frame, and means for simultaneously raising and lowering the seed planting mechanisms including a transverse rock-shaft at the rear of the main-frame, crank arms carried thereby and links between the crank-arms and the seed mechanisms operable to raise and lower the planting mechanisms when the rock shaft is actuated.

4. In a multiple row corn-planter the combination with a main-frame and a plurality of seed planting mechanisms each including a chute and a furrow-opening member at the bottom thereof, of a pair of substantially U-shaped rods for the support of the planting mechanisms, upper and lower bearings on the front sides of the chutes the webs of the rods being journaled in the bearings and the ends of the rods being pivoted to the main-frame and means for simultaneously raising and lowering the planting mechanisms including a transverse rock-shaft mounted on the main-frame, crank arms carried thereby, flexible links connecting the crank-arms with the lower portions of the chutes, and direction pulleys on the main frame over which the flexible links pass.

In testimony whereof, I have hereunto set my hand this 30th day of June, 1917.

ERNEST W. PAULSON.

Copies of this patent may be obtained for five cents each, by addressing the "Commissioner of Patents, Washington, D. C."